(12) United States Patent
Heinemann et al.

(10) Patent No.: US 12,326,334 B2
(45) Date of Patent: Jun. 10, 2025

(54) INDUCTIVE POSITION-MEASURING DEVICE

(71) Applicant: DR. JOHANNES HEIDENHAIN GmbH, Traunreut (DE)

(72) Inventors: Christoph Heinemann, Uebersee (DE); Martin Heumann, Traunstein (DE); Marc Oliver Tiemann, Tettenhausen (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 133 days.

(21) Appl. No.: 18/307,974

(22) Filed: Apr. 27, 2023

(65) Prior Publication Data
US 2024/0102787 A1  Mar. 28, 2024

(30) Foreign Application Priority Data
May 19, 2022 (EP) .................................... 22174216

(51) Int. Cl.
*G01B 7/00* (2006.01)
*G01D 5/20* (2006.01)
*G01D 5/245* (2006.01)

(52) U.S. Cl.
CPC ........... *G01B 7/003* (2013.01); *G01D 5/2053* (2013.01); *G01D 5/2451* (2013.01)

(58) Field of Classification Search
None
See application file for complete search history.

(56) References Cited

U.S. PATENT DOCUMENTS

| | | | | |
|---|---|---|---|---|
| 4,757,244 A | * | 7/1988 | Iwamoto | ................ G01B 7/003 318/653 |
| 10,480,961 B2 | | 11/2019 | Sun et al. | |
| 2003/0217478 A1 | * | 11/2003 | Matsumiya | .......... G01B 5/0014 33/784 |
| 2007/0194781 A1 | * | 8/2007 | Zhitomirskiy | ......... G01D 5/204 324/207.17 |
| 2019/0170494 A1 | | 6/2019 | Tiemann et al. | |

FOREIGN PATENT DOCUMENTS

WO  WO 03074977 A1  9/2003

* cited by examiner

*Primary Examiner* — Jas A Sanghera
(74) *Attorney, Agent, or Firm* — LEYDIG, VOIT & MAYER, LTD.

(57) ABSTRACT

An inductive position-measuring device includes a scanning element and a graduation element movable relative thereto along a direction. The scanning element has an excitation conductor, and first and second receiver tracks each having a receiver conductor, which extends along the direction according to first and second periodic patterns, respectively, over a length. A graduation track has graduation structures formed of ridges and gaps. The ridges have different widths, or the gaps have different depths or different widths, in the direction. The receiver conductors of the first and second receiver tracks are configured to generate first and second signals having first and second period lengths, respectively, wherein n times the first period length equals m times the second period length, with m and n being relatively prime, and n times the first period length and m times the second period length both being less than or equal to the length.

15 Claims, 3 Drawing Sheets

INDUCTIVE POSITION-MEASURING DEVICE

CROSS REFERENCE TO RELATED APPLICATIONS

This application claims benefit to European Patent Application No. EP 22174216.6, filed on May 19, 2022, which is hereby incorporated by reference herein.

FIELD

The invention relates to an inductive position-measuring device for determining relative positions.

Inductive position-measuring devices are used, for example, as measuring devices for determining the relative position of two relatively movable elements. In inductive position-measuring devices, it is common that excitation coils and receiver coils in the form of, for example, conductive traces are applied to a common, generally multilayer circuit board. This unit may be referred to as scanning element. Disposed opposite this scanning element is a graduation element, on which, for example, ridges and gaps are arranged as a graduation structure. When an electrical excitation current that varies over time is applied to the excitation coils, signals which are dependent on the relative position are generated in the receiver coils during relative movement between the graduation element and the scanning element. These signals are then further processed in evaluation electronics.

BACKGROUND

WO 03 074977 A1 describes an encoder for determining an absolute relative position. There, a predetermined number of scanning elements produces the same number of bits for determining the absolute position.

SUMMARY

In an embodiment, the present invention provides an inductive position-measuring device including a scanning element and a graduation element disposed to be movable relative to the scanning element along a first direction. The scanning element has at least one excitation conductor, a first receiver track and a second receiver track. The first receiver track includes at least one receiver conductor, which extends along the first direction according to a first periodic pattern, and which extends at least over a length L. The second receiver track includes at least one receiver conductor, which extends along the first direction according to a second periodic pattern, and which extends over at least the same length L. The graduation element includes a graduation track having graduation structures along the first direction, the graduation structures being formed of ridges and gaps. The ridges have different widths in the first direction or the gaps have different depths or different widths in the first direction. The inductive position-measuring device is configured such that an electromagnetic field generated by the at least one excitation conductor can be modulated by the graduation track. The at least one receiver conductor of the first receiver track is configured to generate a first signal having a first period length, and the at least one receiver conductor of the second receiver track is configured to generate a second signal having a second period length, wherein n times the first period length is equal to m times the second period length, with m and n being relatively prime, and n times the first period length and m times the second period length both being less than or equal to the length L

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
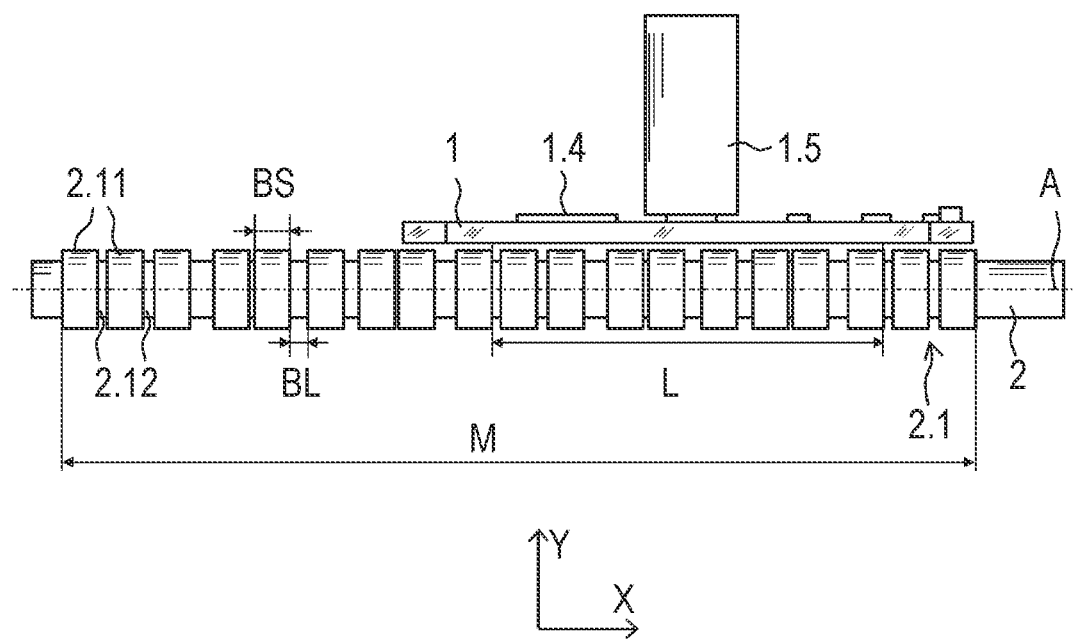
FIG. 1 is a side view of a position-measuring device for determining a relative position.

In an embodiment, the present invention provides an inductive position-measuring device that allows an absolute position to be determined in a simple manner in a first direction extending along receiver tracks.

The inductive position-measuring device according to an embodiment of the present invention has a scanning element and a graduation element, the graduation element being disposed to be linearly movable relative to the scanning element; i.e., along a first direction. The scanning element has at least one excitation conductor. Moreover, the scanning element has a first receiver track that includes at least one receiver conductor, which extends along the first direction according to a first periodic pattern, and which extends at least over a length L. The scanning element further has a second receiver track that includes at least one receiver conductor, which extends along the first direction according to a second periodic pattern, and which extends over at least the same length L. The graduation element includes a graduation track having graduation structures along the first direction, the graduation structures being formed of ridges and gaps, which are in particular alternatingly arranged. In this connection: a) the ridges have different widths in the first direction, and/or b) the gaps have different depths or different widths in the first direction.

The position-measuring device is configured such that an electromagnetic field generated by the at least one excitation conductor can be modulated by the graduation track. A first signal having a first period length $P1.1$ can be generated by the receiver conductor of the first receiver track, and a second signal having a second period length $P1.2$ can be generated by the receiver conductor of the second receiver track. N times the first period length P1.1 is equal to m times the second period length P1.2, with m and n being relatively prime, and n times the first period length P1.1 and m times the second period length P1.2 both being less than or equal to length L. Thus, the following holds:

$$n \cdot P1.1 = m \cdot P1.2 \leq L, \text{ with } (n \perp m; n, m \in)$$

Accordingly, m and n are two natural numbers which do not have a common prime factor. Therefore, morn can also take the value 1. A period length P1.1, P1.2 corresponds in particular to a geometrically linear extent.

Using the position-measuring device, an absolute position of the graduation element relative to the scanning element can be detected by the receiver conductor of the first receiver track and by the receiver conductor of the second receiver track, in particular based on the Vernier principle.

The first and/or second periodic patterns may have a sinusoidal shape. The first receiver track has, in particular, at least one receiver conductor including a plurality of windings arranged in series in the first direction. Similarly, the at least one receiver conductor of the second receiver track may include a plurality of windings arranged in series in the first direction or just one winding. In particular, the receiver conductor of the first receiver track may have more windings than the receiver conductor of the second receiver track.

Advantageously, n times the period length P1.1 and m times the second period length P1.2 are both equal to length L.

$$n \cdot P1.1 = L$$

$$m \cdot P1.2 = L,$$

The first receiver track advantageously has at least two receiver conductors capable of generating two phase-shifted first signals, each having the first period length P1.1. The at least two receiver conductors then extend along the first direction according to the first periodic pattern with first period length P1.1.

In a further embodiment of the invention, the second receiver track has at least two receiver conductors capable of generating phase-shifted second signals, each having the second period length P1.2. The at least two receiver conductors extend along the first direction according to the second periodic pattern with second period length P1.2.

Advantageously, the receiver tracks are arranged one above the other in a second direction that is orthogonal to the first direction. More particularly, the receiver tracks may be arranged in stacked layers of a scanning element in the form of a circuit board.

Advantageously, the first periodic pattern of the receiver conductor of the first receiver track has the first period length P1.1, and the second periodic pattern of the receiver conductor of the second receiver track has the second period length P1.2. In this case, the first signals and the first periodic pattern consequently have the same first period length P1.1. Similarly, the second signals and the second periodic pattern have the same second period length P1.2.

The scanning element and the graduation element are typically disposed opposite each other and spaced apart by an air gap extending in a second direction. In a further embodiment of the invention, first period length P1.1 is shorter than second period length P1.2.

$$P1.1 < P1.2$$

In the second direction, which is orthogonal to the first direction, the second receiver track is disposed at a greater distance from the graduation element than is the first receiver track.

The at least one receiver conductor of the second receiver track may extend over at least three times the second period length P1.2. Accordingly, the following holds:

$$L \geq 3 \cdot P1.2$$

Advantageously, the graduation element has a shape that is rotationally symmetric about an axis oriented parallel to the first direction. Advantageously, the graduation track has ridges and gaps alternatingly arranged along the first direction. Alternatively, the graduation track may be formed by a graduation structure including electrically conductive and non-conductive regions alternatingly arranged along the first direction. The graduation structure may also include other ferromagnetic geometries.

If the graduation element has gaps of different depths, then this can be achieved on the one hand by the graduation element having a constant outer diameter throughout along the first direction, and, accordingly, by the gaps being configured to have different depths. However, alternatively or additionally, the variation in depth may also be achieved by ridges of different heights, in which case the outer diameter of the graduation element is not constant along the first direction.

Advantageously, the width of the smallest gap of the graduation element is not less than 0.5 mm, in particular not less than 0.2 mm.

Advantageously, the graduation element has an extent M in the first direction, which extent M is at least greater than length L plus twice the first period length P1.1:

$$M \geq L + 2 \cdot P1.1$$

In an advantageous embodiment of the invention, it holds in particular that:

$$M \geq L + 4 \cdot P1.1,$$

in particular, it may hold that:

$$M \geq 2 \cdot L$$

In a further embodiment of the invention, the graduation element is configured such that, at least within a portion of the graduation element, the sum of a width of a ridge and a width of a gap adjacent thereto is not equal to the sum of a width of another ridge and a width of a gap adjacent thereto.

Advantageously, first period length P1.1 is greater than the greatest width of a ridge; i.e., the width of the largest ridge. This consideration applies to the case where the width of the ridges varies along the first direction. Alternatively or additionally, first period length P1.1 is also greater than the greatest width of a gap.

In a further embodiment of the invention, each ridge has the same width, while the gaps therebetween have different widths.

Other details and advantages of the inductive position-measuring device according to embodiments of the invention will be apparent from the following description of two exemplary embodiments, taken in conjunction with the accompanying figures.

Figure 2:
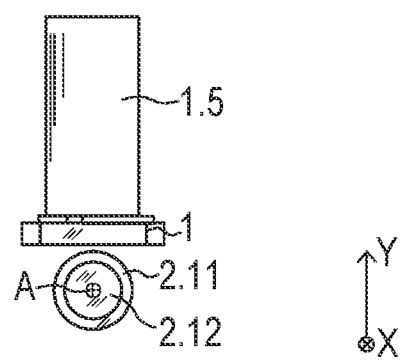
FIG. 2 is a front elevation view of the position-measuring device.

An exemplary embodiment of the invention will be described with reference to a position-measuring device that is designed for determining a relative position between a scanning element 1 and a graduation element 2, or a scale, that is movable along a first direction X (FIGS. 1 and 2).

Graduation element 2 is positioned relative to scanning element 1 such that scanning element 1 and graduation element 2 are disposed opposite each other with an air gap therebetween, the air gap extending in a second direction Y.

Graduation element 2 is configured as a body that is rotationally symmetric about an axis A. This body may be monolithically formed from a metal material, for example, brass, as in the exemplary embodiment presented here. Graduation element 2 has a graduation track 2.1. Graduation track 2.1 extends along first direction X (measurement direction) and has ridges 2.11 and gaps 2.12 therebetween. Accordingly, graduation track 2.1 is composed of a sequence of alternating ridges 2.11 and gaps 2.12. In the exemplary embodiment presented here, each ridge 2.11 has a width BS of 3.65 mm. In contrast, gaps 2.12 have different widths BL along first direction X. Here, width BL is not greater than about 2.66 mm and not less than about 0.33 mm. In the exemplary embodiment presented here, graduation element 2 is manufactured by a machine turning process, the ridges 2.11 having sharp edges at the surfaces axially delimiting the ridges 2.11. Alternatively, however, graduation element 2 may also be configured such that relatively rounded transitions exist between ridges 2.11 and gaps 2.12.

Scanning element 1 includes a circuit board 1.1 having a plurality of layers, as well as electronic components 1.4 mounted on circuit board 1.1. Also disposed on scanning element 1 is a connector element 1.5, to which a cable may be attached, thereby allowing scanning element 1 to be connected to subsequent electronics. Scanning element 1 is used for scanning the graduation element 2.

In order to allow determination of the relative position, scanning element 1 has a first receiver track 1.1 and a second receiver track 1.2, the receiver tracks 1.1, 1.2 being disposed in different planes or layers.

Figure 3:
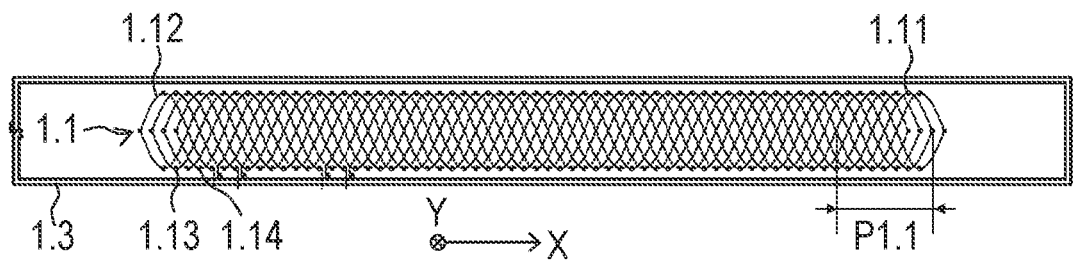
FIG. 3 is a plan view of a first receiver track and an excitation conductor of a scanning element.

FIG. 3 shows an enlarged detail view of first receiver track 1.1. First receiver track 1.1 includes a first receiver conductor 1.11, a second receiver conductor 1.12, a third receiver conductor 1.13, and a fourth receiver conductor 1.14. First receiver track 1.1 is surrounded by an excitation conductor 1.3.

Figure 4:
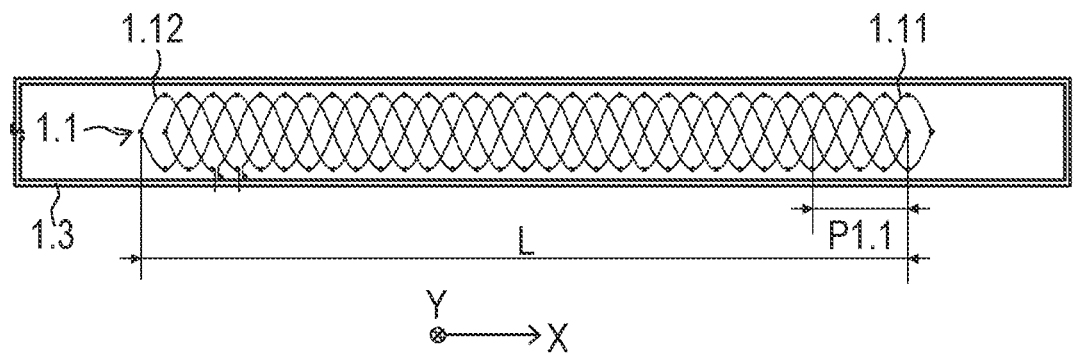
FIG. 4 is a plan view showing only two receiver conductors of the first receiver track of the scanning element and the excitation conductor.

In FIG. 4, only first receiver conductor 1.11 and second receiver conductor 1.12 of first receiver track 1.1 are shown for purposes of clearer illustration. The receiver conductors 1.11, 1.12 shown in FIG. 4 produce signals that are 90 degrees out of phase.

In the exemplary embodiment presented here, first receiver track 1.1 includes four receiver conductors 1.11, 1.12, 1.13, 1.14 which are offset relative to one another in first direction X so that they can produce four phase-shifted signals according to the offset. Receiver conductors 1.11, 1.12, 1.13, 1.14 are here in the form of conductive traces and extend, connected by vias, in different layers of the circuit board; i.e., of scanning element 1, thereby avoiding undesired short circuits at crossing points of conductors. Although, strictly speaking, each of the receiver conductors 1.11, 1.12, 1.13, 1.14 is composed of many conductor portions which are distributed in two planes or layers and arranged in series, such a structure is hereinafter collectively referred to as a receiver conductor 1.11, 1.12, 1.13, 1.14.

Receiver conductors 1.11, 1.12, 1.13, 1.14 have a spatially periodic shape which is substantially in sine or sinusoidal form, with all receiver conductors 1.11, 1.12, 1.13, 1.14 of first receiver track 1.1 having a first period length P1.1 (FIG. 3). Each receiver conductor 1.11, 1.12, 1.13, 1.14 of first receiver track 1.1 extends over a length L equal to a multiple of first period length P1.1:

$$L = n \cdot P1.1, \text{ with } n \in N$$

In the exemplary embodiment presented here, it holds that length L is eight times (n=8) the first period length P1.1. In this example, first period length P1.1 takes a value of 5.145 mm, so that length L is here 41.16 mm.

Figure 7:
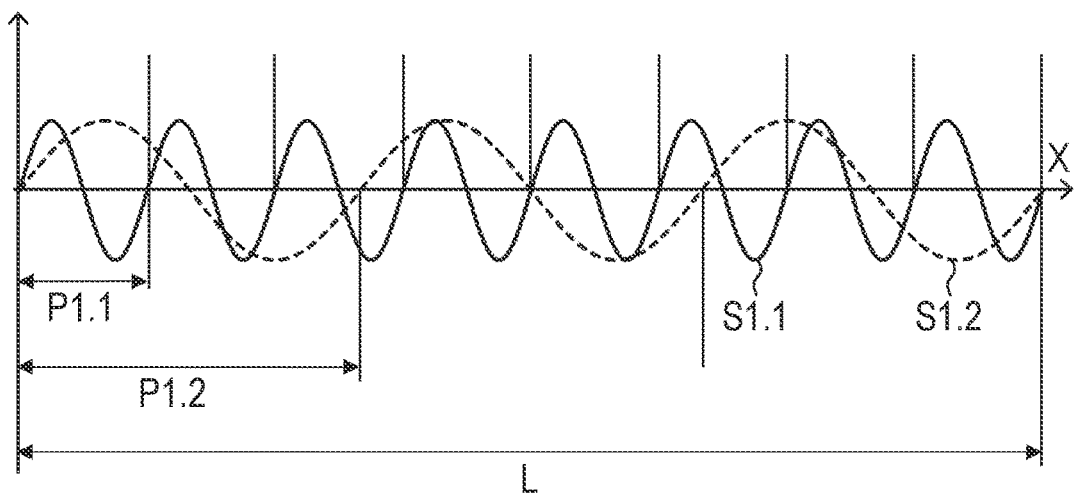
FIG. 7 is a diagram of the waveforms of a first receiver conductor and a second receiver conductor.

As illustrated in FIG. 3, in the exemplary embodiment presented here, adjacent receiver conductors 1.11, 1.12, 1.13, 1.14 within first receiver track 1.1 are arranged along first direction X such that they are offset relative to one another by one-eighth of the full sinusoidal period; i.e., of first period length P1.1. Receiver conductors 1.11, 1.12, 1.13, 1.14 are electrically connected such that they produce 0° and 90° signals on the one hand and 45° and 135° signals on the other hand. A first position signal can be determined from the 0° and 90° signals, and a second position signal, which is redundant with respect to the first position signal, can be determined from the 45° and 135° signals. First receiver conductors 1.11, 1.12, 1.13, 1.14 basically make it possible to generate a relatively high-resolution incremental signal when graduation element 2 moves relative to scanning element 1. FIG. 7 shows, by way of example, a waveform of a first signal S1.1 which is generated by a receiver conductor 1.11, 1.12, 1.13, 1.14 of first receiver track 1.1 when graduation element 2 is moved through a distance equal to length L.

Figure 5:
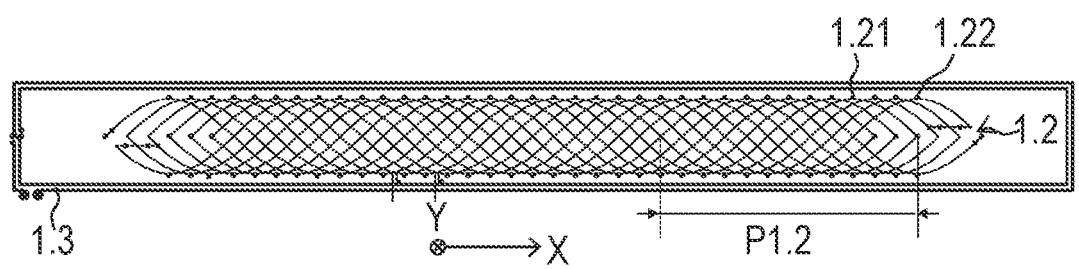
FIG. 5 is a plan view of a second receiver track and an excitation conductor of the scanning element.
Figure 6:
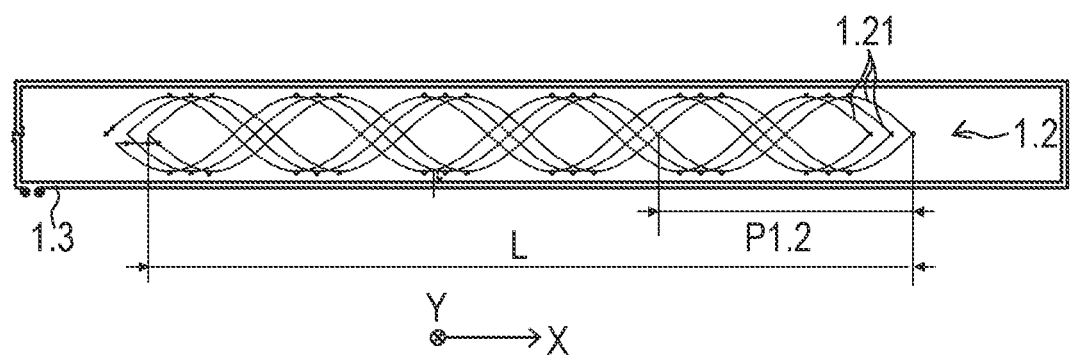
FIG. 6 is a plan view showing only one receiver conductor of the second receiver track of the scanning element and the excitation conductor.

FIGS. 5 and 6 show a second receiver track 1.2, which is disposed in two layers of scanning element 1; i.e. of the circuit board, so that second receiver track 1.2 is offset relative to first receiver track 1.1 in second direction Y. Moreover, first receiver track 1.1 is arranged in overlapping relationship with respect to second receiver track 1.2. In the exemplary embodiment presented here, second receiver track 1.2 is farther away from graduation element 2 and axis A than first receiver track 1.1.

As illustrated in FIG. 5, in the exemplary embodiment presented here, second receiver track 1.2 includes a fifth receiver conductor 1.21 and a sixth receiver conductor 1.22; i.e., two receiver conductors 1.21, 1.22, which are offset relative to one another in first direction X so that they can produce two 90° phase-shifted signals according to the offset. Receiver conductors 1.21, 1.22 are in the form of conductive traces and, here too, extend, connected by vias, in different layers of the circuit board; i.e., of scanning element 1. Here, both fifth receiver conductor 1.21 and sixth receiver conductor 1.22 are embodied as triplicates and serially interconnected. More particularly, fifth receiver conductor 1.21 (0° receiver conductor) and sixth receiver conductor 1.22 (90° receiver conductor) are each electrically triplicated by +30° and −30°. Thus, fifth receiver conductor 1.21 detects the position of graduation element 2 at the positions 30°, 0° and +30° (with respect to the phase angle of the received signals). Accordingly, sixth receiver conductor 1.22 detects the position of graduation element 2 at the positions 60°, 90° and 120° (with respect to the phase angle of the received signals).

As can be seen in FIG. 6, the conductive trace portions of fifth receiver conductor 1.21 are serially interconnected at the left end of second receiver track 1.2. In contrast, in sixth receiver conductor 1.22, the corresponding interconnection is made at the right end of second receiver track 1.2 (FIG. 5). This serial interconnection results in a respective 0°-signal and a respective 90°-signal with increased signal amplitudes.

An increase of the signal amplitudes is advantageous particularly for second receiver track 1.2 because it is spaced farther apart from graduation element 2 than first receiver track 1.1 in second direction Y. FIG. 7 shows, by way of example, a waveform of a second signal S1.2 which is generated by a receiver conductor 1.21, 1.22 of second receiver track 1.2 when graduation element 2 is moved through a distance equal to length L.

Fifth and sixth receiver conductors 1.21, 1.22 also have a spatially periodic shape which is substantially in sine or sinusoidal form, with both receiver conductors 1.21, 1.22 of second receiver track 1.2 having a second period length P1.2 (FIG. 6). In the exemplary embodiment presented here, second period length P1.2 is 13.72 mm. In the exemplary embodiment presented here, second period length P1.2 is greater than first period length P1.1, and thus, first period length P1.1 is not equal to second period length P1.2. Fifth and sixth receiver conductors 1.21, 1.22 each extend over a length L equal to a multiple of second period length P1.2:

$$L = m \cdot P1.2, \text{ with } m \in N$$

In the exemplary embodiment presented here, it holds that length L is three times (m=3) the second period length P1.2, and accordingly length L=41.16 mm=13.72 mm·3.

In the assembled state shown in FIG. 1, scanning element 1 and graduation element 2 are disposed opposite each other with an air gap therebetween, so that when graduation element 2 and scanning element 1 move relative to each other, a signal dependent on the relative position can be generated by inductive effects in each of receiver conductors 1.11, 1.12, 1.13, 1.14, 1.21, 1.22. It is a prerequisite for the generation of corresponding signals that excitation conductor 1.3 generate a time-varying electromagnetic excitation field in the area of the respectively scanned graduation structures 2.1. In the exemplary embodiment shown, excitation conductor 1.3 takes the form of a plurality of planar-parallel, current-carrying, individual conductive traces. Scanning element 1 includes an electronic circuit including the electronic components 1.4. The electronic circuit may also include an ASIC device, for example. This electronic circuit of scanning element 1 works not only as an evaluation element, but also as an excitation control element, under whose control the excitation current is generated or produced, which then flows through excitation conductor 1.3.

When excitation conductor 1.3 is energized, then an electromagnetic field oriented in the shape of a tube or cylinder forms around excitation conductor 1.3. The field lines of the resulting electromagnetic field extend around excitation conductor 1.3, the direction of the field lines depending on the direction of the current in excitation conductor 1.3 as is generally known. In the area of ridges 2.11, eddy currents are induced, so that the field is in each case modulated as a function of the relative position. Accordingly, the relative position can be measured by each of receiver conductors 1.11, 1.12, 1.13, 1.14, 1.21, 1.22.

First receiver track 1.1 scans graduation element 2 with its receiver conductors 1.11, 1.12, 1.13, 1.14, which extend with a smaller first period length P1.1, so that first receiver track 1.1 allows a relatively fine determination of the relative position. At the same time, the second receiver track 1.2 located thereabove scans graduation element 2 with its receiver conductors 1.21, 1.22, which extend with a coarser second period length P1.2. Thus, second receiver track 1.2 allows a relatively coarse determination of the relative position. Apart from that, all receiver conductors 1.11, 1.12, 1.13, 1.14 of first receiver track 1.1 have the same first period length P1.1, and the receiver conductors 1.21, 1.22 of second receiver track 1.2 each have the same second period length P1.2. The two receiver tracks 1.1, 1.2 are scanned simultaneously; no switching between individual receiver tracks 1.1, 1.2 is needed. A signal S1.1 received by a receiver conductor 1.11, 1.12, 1.13, 1.14 of first receiver track 1.1 and a signal S1.2 received by a receiver conductor 1.21, 1.22 of second receiver track 1.2 are illustrated in FIG. 7. It is apparent therefrom that when graduation element 2 undergoes a relative movement along first direction X through a distance equal to length L; i.e., here through a distance of 41.16 mm, then receiver conductors 1.11, 1.12, 1.13, 1.14 of first receiver track 1.1 generate signals S1.1 having eight (n=8) full signal periods, while receiver conductors 1.21, 1.22 of second receiver track 1.2 generate signals S1.2 having only three (m=3) signals periods over the same distance traveled. The received signals S1.1, S1.2 are combined by means of a beat or vernier algorithm, so that the relative position between scanning element 1 and graduation element 2 can be determined in an absolute manner by the two signals S1.1, S1.2. In this context, it is of importance that n times the first period length P1.1 is equal to m times the second period length P1.2 of the respective generated electrical signals S1.1, S1.2, with n and m being relatively prime.

$$n \cdot P1.1 = m \cdot P1.2 = L, \text{ with } (n \perp m)$$

Thus, in the exemplary embodiment presented here, the first periodic pattern of receiver conductors 1.11, 1.12, 1.13, 1.14 of first receiver track 1.1 has the first period length P1.1, and the second periodic pattern of receiver conductors 1.21, 1.22 of second receiver track 1.2 has the second period length P1.2. Moreover, the signals S1.1 generated by receiver conductors 1.11, 1.12, 1.13, 1.14 of first receiver track 1.1 have the first period length P1.1, and the signals S1.2 generated by receiver conductors 1.21, 1.22 of second receiver track 1.2 have the second period length P1.2.

Figure 8:
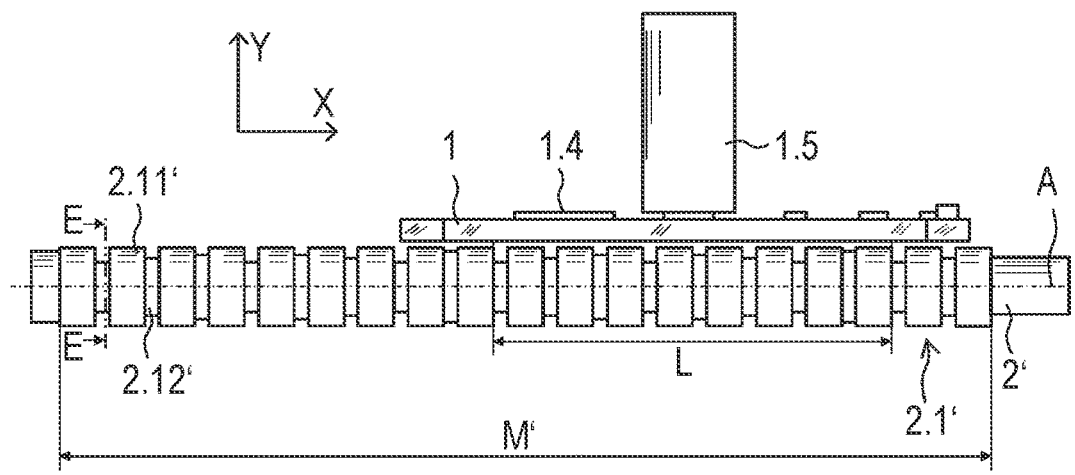
FIG. 8 is a side view of a position-measuring device for determining a relative position according to a second exemplary embodiment.
Figure 9:
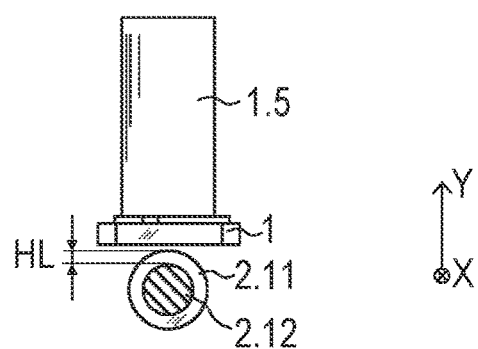
FIG. 9 is a sectional view of the position-measuring device according to the second exemplary embodiment.

A second exemplary embodiment can be illustrated with reference to FIGS. 8 and 9. The second exemplary embodiment differs from first one in that a modified graduation element 2' is used. This modified graduation element 2' has a graduation track 2.1', which extends along first direction X and has ridges 2.11' and gaps 2.12' therebetween. In the second exemplary embodiment, gaps 2.12' have different depths HL along first direction X (FIG. 9); i.e., different distances from scanning element 1 in the scanning region. In contrast, each ridge 2.11' in the scanning regions has the same distance from scanning element 1. By the arrangement of gaps 2.12' having different depths, position information is mapped into graduation element 2'.

The rotationally symmetric design of graduation element 2' enables accurate determination of the relative position even if, due to the installation situation or because of drift motions, graduation element 2, 2' is rotated about axis A during a measurement.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An inductive position-measuring device, comprising:
a scanning element having at least one excitation conductor, a first receiver track and a second receiver track, the first receiver track including at least one receiver conductor, which extends along a first direction according to a first periodic pattern, and which extends at least over a length L, and the second receiver track including at least one receiver conductor, which extends along the first direction according to a second periodic pattern, and which extends over at least the same length L; and
a graduation element disposed to be movable relative to the scanning element along the first direction, the graduation element including a graduation track having graduation structures along the first direction, the graduation structures being formed of ridges and gaps, wherein the ridges have different widths in the first direction or the gaps have different depths or different widths in the first direction,
wherein the inductive position-measuring device is configured such that an electromagnetic field generated by the at least one excitation conductor can be modulated by the graduation track as eddy currents are induced in an area of the ridges,
wherein the at least one receiver conductor of the first receiver track is configured to generate a first signal having a first period length,
wherein the at least one receiver conductor of the second receiver track is configured to generate a second signal having a second period length, and
wherein n times the first period length is equal to m times the second period length, with m and n being relatively prime, and n times the first period length and m times the second period length both being less than or equal to the length L.

2. The inductive position-measuring device as recited in claim 1, wherein the first receiver track has at least two receiver conductors each being configured to generate first signal having the first period length.

3. The inductive position-measuring device as recited in claim 1, wherein the second receiver track has at least two receiver conductors each being configured to generate the second signal having the second period length.

4. The inductive position-measuring device as recited in claim 1, wherein the first and second receiver tracks are arranged one above the other in a second direction that is orthogonal to the first direction.

5. The inductive position-measuring device as recited in claim 1, wherein the first periodic pattern has the first period length, and the second periodic pattern has the second period length.

6. The inductive position-measuring device as recited in claim 5, wherein the at least one receiver conductor of the second receiver track extends over at least three times the second period length.

7. The inductive position-measuring device as recited in claim 1, wherein the first period length is shorter than the second period length, and, in a second direction that is orthogonal to the first direction, the second receiver track is disposed at a greater distance from the graduation element than the first receiver track.

8. The inductive position-measuring device as recited in claim 1, wherein the graduation element has a shape that is rotationally symmetric about an axis oriented parallel to the first direction.

9. The inductive position-measuring device as recited in claim 1, wherein the graduation element has an extent in the first direction, the extent being at least greater than the length L plus twice the first period length.

10. The inductive position-measuring device as recited in claim 1, wherein a sum of a width of a ridge and a width of a gap adjacent thereto is not equal to a sum of a width of another ridge and a width of a gap adjacent thereto.

11. The inductive position-measuring device as recited in claim 1, wherein the first period length is greater than a greatest width of a ridge and/or greater than a greatest width of a gap.

12. The inductive position-measuring device as recited in claim 1, wherein each ridge has the same width.

13. The inductive position-measuring device as recited in claim 1, wherein the electromagnetic field generated by the at least one excitation conductor can be modulated by the graduation track without using a magnet.

14. The inductive position-measuring device as recited in claim 13, wherein the graduation element does not include a magnetic material.

15. The inductive position-measuring device as recited in claim 14, wherein the graduation element is monolithically formed from brass.

* * * * *